(12) United States Patent
Carmichael

(10) Patent No.: US 11,200,743 B2
(45) Date of Patent: Dec. 14, 2021

(54) SOCIAL NETWORK ACCESS VIA VIRTUAL-REALITY

(71) Applicant: Christopher Carmichael, Irvine, CA (US)

(72) Inventor: Christopher Carmichael, Irvine, CA (US)

(*) Notice: Subject to any disclaimer, the term of this patent is extended or adjusted under 35 U.S.C. 154(b) by 0 days.

(21) Appl. No.: 15/939,578

(22) Filed: Mar. 29, 2018

(65) Prior Publication Data

US 2018/0286133 A1    Oct. 4, 2018

Related U.S. Application Data

(60) Provisional application No. 62/478,695, filed on Mar. 30, 2017.

(51) Int. Cl.

| | |
|---|---|
| *G06T 19/00* | (2011.01) |
| *G06F 3/0483* | (2013.01) |
| *G06Q 50/00* | (2012.01) |
| *G02B 27/01* | (2006.01) |
| *G06F 3/0482* | (2013.01) |

(52) U.S. Cl.
CPC ........ *G06T 19/006* (2013.01); *G02B 27/0172* (2013.01); *G06F 3/0482* (2013.01); *G06F 3/0483* (2013.01); *G06Q 50/01* (2013.01)

(58) Field of Classification Search
CPC ... G06T 19/006; G06F 3/0482; G06F 3/0483; G06Q 50/01
See application file for complete search history.

(56) References Cited

U.S. PATENT DOCUMENTS

| | | | | |
|---|---|---|---|---|
| 2007/0019000 | A1* | 1/2007 | Motomura | G06F 1/1626 345/619 |
| 2010/0107080 | A1* | 4/2010 | Bentley | G11B 27/034 715/723 |
| 2015/0243079 | A1* | 8/2015 | Cho | G02B 27/017 345/633 |
| 2015/0293530 | A1* | 10/2015 | Haskell | G05B 19/41865 700/97 |
| 2017/0115728 | A1* | 4/2017 | Park | G02B 27/0093 |
| 2017/0116339 | A1* | 4/2017 | Stein | G06F 17/30867 |

* cited by examiner

*Primary Examiner* — Grace Q Li
(74) *Attorney, Agent, or Firm* — Law Office of Scott C Harris, Inc

(57) ABSTRACT

A virtual-reality that includes multiple different features therein, those features arranged in a combined wall. The user can select from the multiple features by looking at the features for a specified amount of time for example 3 seconds. One embodiment uses a wall which combines together a number of feeds from a number of social networks. Another embodiment uses a wall that is cylindrical or spherical around the user, and a system that detects which post or item the user is looking at. When the user looks at a poster item for more than the specified amount of time, additional information about that poster item pops up. For example the user can look it up icon representing their friend, and get information about their friend including the ability to message the friend, posts that the friend has made, and other information about the friend. There can also be navigation pains in places in the virtual-reality cylinder or sphere which enables navigating using a different kind of menu.

16 Claims, 2 Drawing Sheets

SOCIAL NETWORK ACCESS VIA VIRTUAL-REALITY

This application claims priority from provisional application No. 62/478,695, filed Mar. 30, 2017; the entire contents of which are herewith incorporated by reference.

BACKGROUND

U.S. Pat. No. 9,648,114, having a common inventor to the present application, describes a system of displaying multiple data feeds from multiple online social networks in a way that combines the different feeds from the different networks so that a user can view these different feeds from the different networks. U.S. Pat. No. 9,648,114 shows these as a timeline view, where different objects in the image represent different social network items from different feeds.

SUMMARY

The present application describes using virtual-reality to view one or multiple social networks.

BRIEF DESCRIPTION OF THE DRAWINGS

The drawings show different aspects of the invention, where.

DETAILED DESCRIPTION

Figure 1:
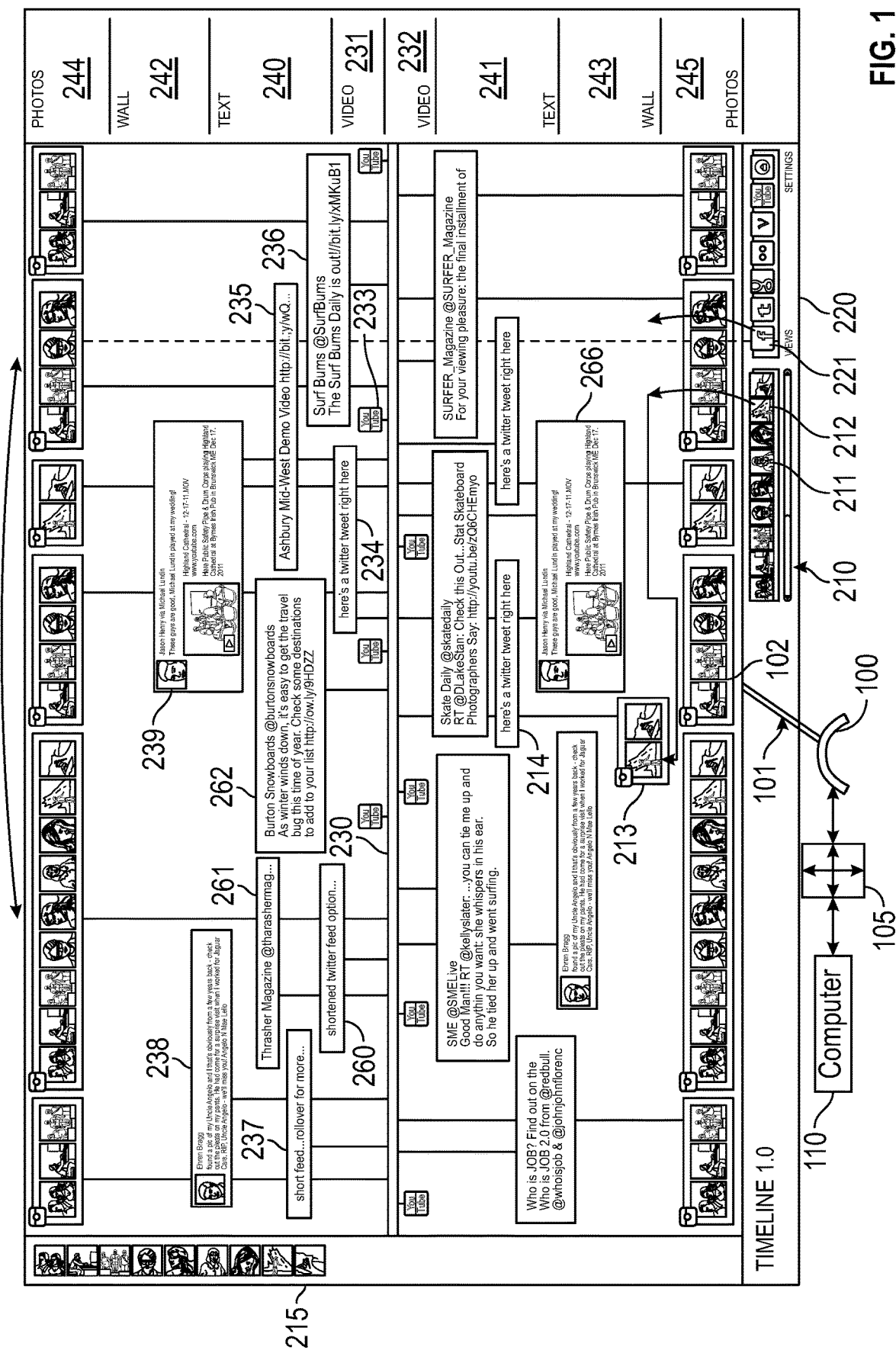
FIG. 1 shows a view where multiple social feeds are combined into a single timeline.

FIG. 1 shows an embodiment where multiple different social networks are combined into one timeline using the social network timeline described in U.S. Pat. No. 9,648,114. Social network posts are posted along the horizontal axis in FIG. 1, with different times represented by different areas along the horizontal axis.

The vertical axis shows the different posts and post types from multiple different networks at a specific time indicated by the time on the horizontal axis. The timeline surrounds the user in the virtual reality space, and the user turns to advance along reading the timeline. According to this embodiment, the user can advance along the timeline by moving their head and advancing forward in time, back in time, or between the different feeds by moving up and down. In FIG. 1, 100 shows the virtual-reality headpiece that a user can use to move their head, where the movement is detected by a gyroscope 105 and converted into Information indicative of the direction 101 in which the user is looking, both in terms of the horizontal axis and the vertical axis. In this embodiment, for example, the user is looking via direction 101 at position 102. This is detected by the gyroscope 105, and coupled to the computer 110 which operates based on this information. Based on the position of the user's head in the virtual-reality device, the system can detect the position in both horizontal axis (time) and vertical axis (feed) that the user is looking at.

In another embodiment, the view of FIG. 1 which is shown as flat actually extends in a curve around the user, e.g. all the way around the user in a complete circle. As the user turns around in the clockwise direction, the user advances along the timeline. As the user turns around in the counter-clockwise direction, the user advances backwards in the timeline. According to this embodiment, there are also setting areas 221 which allow the user to select one or more settings for navigation or for viewing.

The user can select the length of the timeline, indicating the length of time that the timeline represents, for example is the timeline one day or one week or one hour. However long the timeline is, however, it will extend around the circle of the virtual-reality space. The settings can also include 221 indicating which of the different social networks will appear in the accumulated social network. As explained in U.S. Pat. No. 9,648,114, the entire contents of which are herewith incorporated by reference, this can include videos, such as from YouTube, texts such as from twitter, wall posts such as from Facebook, and photos such as from Instagram or Flickr. Other social networks can also be included. The social network aggregation shown in FIG. 1 extends around the 360 degree field around the user, and the user turns their gaze to view along the timeline.

According to all the embodiments, the virtual-reality is used to select from a social network page. The user can select any item on the page by looking at that item for 3 seconds (or some other selectable time). Looking at the item for 3 seconds provides more information about the item. For example, the item 237 is a shortened feed, which can be looked at for 3 seconds in order to obtain more information about the feed. The YouTube video such as 233 can be viewed by looking at the video for 3 seconds.

In another embodiment, a virtually spherical or cylindrical wall of information 200 is displayed to the user, who can navigate around the wall between friends and different items that are on the wall. The different items can include different friends, and different things that can be viewed on a social network wall. In addition, different areas on the wall include navigation panes such as 1205, 1210. Rather than having to go all the way around the wall, the user can look at a navigation pane e.g. 1211, 1212 in order to bring up a special menu shown as 900. The menu 900 that is brought up can be a sprocket style menu, of the type that is described in our patent application Ser. No. 13/205,422. The sprocket menu can allow the user to bring up videos or other information, or to navigate to a specified point in the navigation pane. For example, the user can look for certain kinds of information at any navigation point, rather than having to navigate all the way around the 360 degree wall.

The embodiment describes operating using a cylindrical wall, where the user can turn around in circles to find different items. However, the wall can be multidimensional like in FIG. 1, e.g. the user can also look up to see another range of information, or look down to see information below the information. When the wall is referred to as being cylindrical, this indicates that the direction being viewed in the pan direction, that is rotating in the horizontal plane, is used to view the information, as well as the information in the tilt direction, that is in the vertical plane.

Different options can also be set, for example, where the user can navigate in different ways as they travel around the wall.

Figure 2:
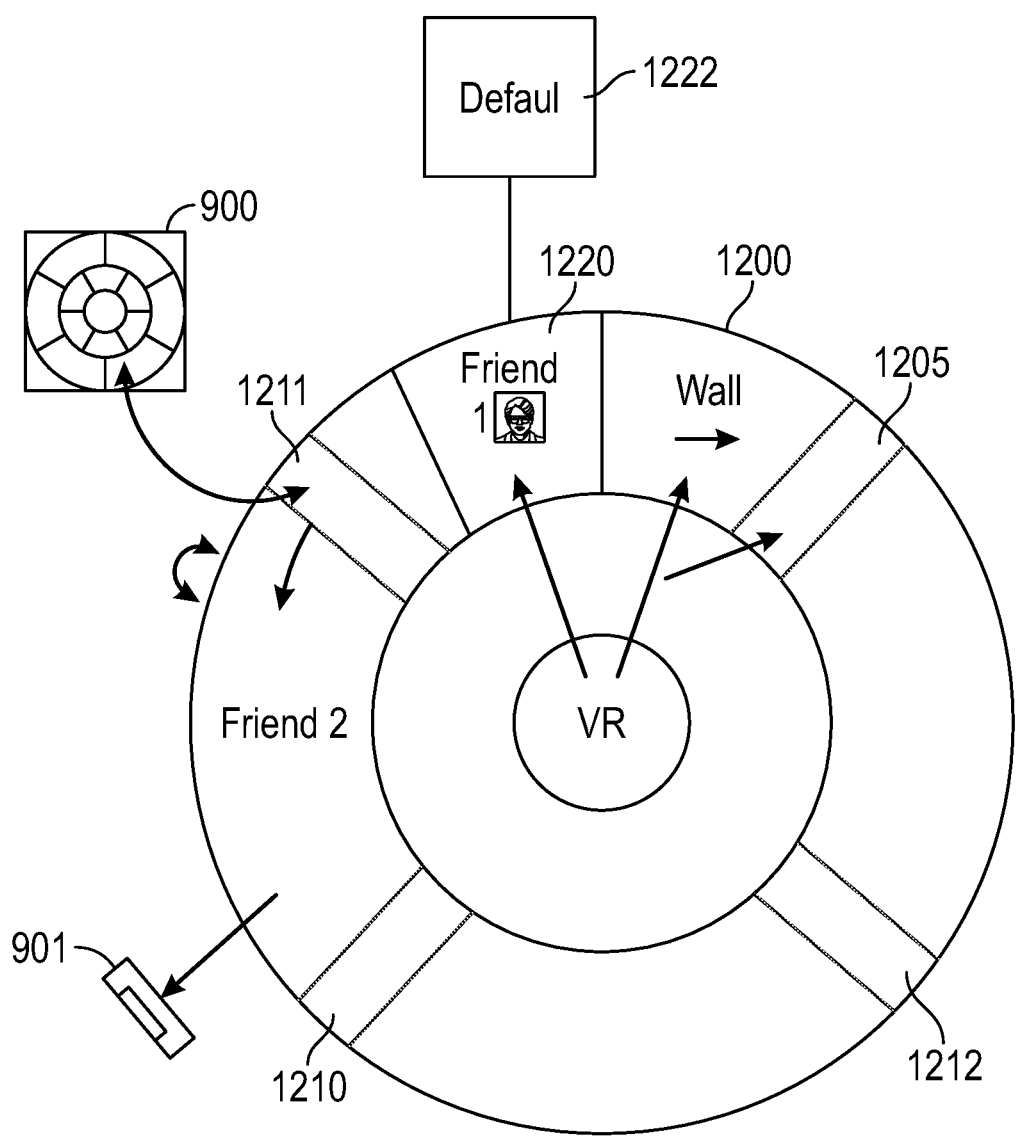
FIG. 2 shows a wraparound view of social networks.

According to an embodiment, this virtual-reality system in both the FIG. 1 embodiment and the FIG. 2 embodiment is navigated using a virtual reality headset such as 100. However, this can also be navigated using for example a cellular phone 901, where the gyroscope or position sensor within the cellular phone brings up a portion of the wall depending on the pointing direction of the cellular phone. The user can turn around in a circle with the cellular phone in order to bring up different parts of the cellular phone. The screen of the cellular phone shows what the user is looking at, and in one embodiment, the cellular phone can display a grid, so that the user can keep the selected item inside the grid for the specified amount of time in order to select it.

Another embodiment can do this on a display screen, where the user can navigate around a virtual circle using arrows for cursor movement on the flat screen.

As in the first embodiment, the user can look at any item for 3 seconds in order to find more information about that item. For example, the user can look at friend 1, shown as 1220 for 3 seconds in order to find a detailed page 1222 about friend 1. For example, when the user sees friend 1, 1220 may include a small photograph of friend 1 which is selected to bring up in detail about friend 1 that shows posts, location, the ability to send a message, and other information about friend 1. Other things that can be shown within the virtual-reality environment include suggested new friends, or any other information that can be shown on the social network.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example while the above describes only certain kinds of user interface devices, it should be understood that other kinds of devices may similarly be used. Also, this can be used in a similar way with other social network layouts.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Any kind of processor or client can be used with this invention.

What is claimed is:

1. A system providing a virtual reality-based social network page, comprising:
   a computer system, running a program that shows a social network page where different items on the page are located at different locations;
   a virtual reality system, that monitors where the user is looking on the page, and determines which of the items on the page the user is looking at, wherein the computer system displays the page in the shape of a cylindrical wall, and the user turns around in a circle to navigate between the different items displayed on the cylindrical wall, where the social network page has posts which advance in time in a direction around the circle, and where the computer system detects the user turning in a circle to advance along the timeline either forward in time when the user looks at the page by rotating around the circle in a first direction, and to go back in time when the user looks at the page by rotating along the circle in a second direction opposite to the first direction, and to advance between the different feeds at similar times when the user looks at the page by moving up and down,
   wherein the computer detects both a horizontal axis for time and a vertical axis for a specific item that the user is looking at,
   and where the page is organized to have
   a first section for videos arranged at a first location along the vertical axis,
   a second section for text style messages arranged at a second location along the vertical axis, and
   a third section for photos, arranged at a third location along the vertical axis;
   and where items on the page include control items which are selected when the user views the control item for a specified amount of time or more.

2. The system as in claim 1, wherein the computer system displays a social network page that includes multiple different social network feeds combined together onto a single page to have the videos, text style messages and photos from each of the multiple different social network feeds at the respective locations along the vertical axis.

3. The system as in claim 1, wherein there are first and second items on the wall that are selected by moving the user's head to locations of the first and second items, and at least one location other than locations of the first and second items, on the cylindrical wall includes a navigation pane, which when selected, brings up a menu that allows selecting items including said first and second items on the wall from the menu without the user needing to move their head to face the locations of the first and second items.

4. The system as in claim 1, wherein the virtual-reality system is a virtual reality headset.

5. The system as in claim 1, wherein the virtual-reality system is a cellular phone which detects its position of pointing using hardware on the cellular phone.

6. The system as in claim 1, wherein the computer provides a detailed page about a social network friend, when the user looks at the friend for more than a specified amount of time, where the detail page includes at least posts made by the friend, and a menu that enables sending a message to the social network friend.

7. The system as in claim 1, wherein the computer system displays the page is defined in the shape of a semi-spherical wall, and the user turns around in a circle horizontally to navigate between the different items displayed on the wall and also turns vertically to navigate between different items displayed on the wall.

8. The system as in claim 1, wherein the page includes a centerline at a constant location along the vertical axis,
   where the first section for videos includes first and second areas for videos including the first area for videos being above the centerline and the second area for videos being below the centerline, the first and second areas for videos being symmetrically disposed relative to the centerline;
   where the second section for text includes third and fourth areas for text including the third area for text being above the centerline and the fourth area for text being below the centerline, the third and fourth areas for text being symmetrically disposed relative to the centerline;
   and where the third section for photos includes fifth and sixth areas for photos including the fifth area for photos being above the centerline and the sixth area for photos being below the centerline, the fifth and sixth areas for photos being symmetrically disposed relative to the centerline.

9. The system as in claim 1, wherein the control item is an icon that represents content from a specified social network, and the icon is selected by looking at the icon for more than the specified time to move items from the specified social network into the page, and the icon once selected is deselected by looking at the icon for more than a specified time, which removes items from the specified social network off of the page.

10. The system as in claim 1, wherein the control item is an icon indicative of a video, and the video itself is viewed by looking at the icon for more than the specified time.

11. A method of providing a virtual reality-based social network page, comprising:
running a program on a computer system that shows a social network page where different items on the page are located at different locations;
using a virtual reality system for monitoring locations where the user is looking on the page, and determining which of the items on the page the user is looking at, wherein the computer system displays the page in the shape of a cylindrical wall, and the user turns around in a circle to navigate between the different items displayed on the wall, where the social network page has posts which advance in time along a horizontal axis, in a direction around the circle, and where the computer system detects the user turning in a circle to advance along the timeline either forward in time when moving around the circle in a first direction, back in time by moving along the circle in a second direction opposite to the first direction, or to advance between the different feeds at similar times by moving up and down along a vertical axis,
displaying additional information about an item on the page by detecting both the horizontal axis for time and the vertical axis for feeds at a specific time, that the user is looking at and, and selects an item when the user views the item for a specified amount of time or more;
wherein the page includes a centerline at a constant location along the vertical axis, including a first section for videos which includes first and second areas for videos including the first area for videos being above the centerline and the second area for videos being below the centerline, the first and second areas for videos being symmetrically disposed relative to the centerline;
where the page includes a second section for text that includes third and fourth areas for text including the third area for text being above the centerline and the fourth area for text being below the centerline, the third and fourth areas for text being symmetrically disposed relative to the centerline;
and where the pages includes a third section for photos which includes fifth and sixth areas for photos including the fifth area for photos being above the centerline and the sixth area for photos being below the centerline, the fifth and sixth areas for photos being symmetrically disposed relative to the centerline.

12. The method as in claim 11, further comprising displaying a social network page that includes multiple different social network feeds combined together onto a single page to have the videos, text and photos from each of the multiple different social network feeds at the respective locations along the vertical axis at locations both above and below the centerline.

13. The method as in claim 11, wherein there are first and second items on the wall that are selected by moving the user's head to locations of the first and second items, and at least one location other than locations of the first and second items, on the cylindrical wall includes a navigation pane, which when selected, brings up a menu that allows selecting items including said first and second items on the wall from the menu without the user needing to move their head to face the locations of the first and second items.

14. The method as in claim 11, wherein the method provides a detailed page about a social network friend, when the user looks at the friend for more than a specified amount of time, where the detail page includes at least posts made by the friend, and a menu that enables sending a message to the social network friend.

15. The method as in claim 11, wherein the method displays the page that is defined in the shape of a semi-spherical wall, and the user turns around in a circle horizontally to navigate between the different items displayed on the wall and also turns vertically to navigate between different items displayed on the wall.

16. The method as in claim 11, wherein the control item is an icon that represents content from a specified social network, and the icon is selected by looking at the icon for more than the specified time to move items from the specified social network on to the page, and the icon once selected is deselected by looking at the icon for more than a specified time, which removes items from the specified social network off of the page.

* * * * *